United States Patent [19]

Breisch

[11] Patent Number: 4,907,684
[45] Date of Patent: Mar. 13, 1990

[54] BALL DRAIN VALVE FOR THE PISTON SPACE OF A ROTARY MULTI-DISC CLUTCH

[75] Inventor: Harald Breisch, Kressbronn, Fed. Rep. of Germany

[73] Assignee: Zahnradfabrik Friedrichshafen AG, Fed. Rep. of Germany

[21] Appl. No.: 324,203

[22] Filed: Mar. 15, 1989

[30] Foreign Application Priority Data

Mar. 17, 1988 [DE] Fed. Rep. of Germany ....... 3808865

[51] Int. Cl.$^4$ ............................................. F16D 25/14
[52] U.S. Cl. .......................... 192/106 F; 192/85 AA; 192/103 FA; 137/56; 91/442
[58] Field of Search ....... 192/106 F, 85 AA, 103 FA, 192/104 F; 91/404, 442; 137/56

[56] References Cited

U.S. PATENT DOCUMENTS

| | | | |
|---|---|---|---|
| 2,876,743 | 3/1959 | Maki | 192/106 F |
| 2,954,040 | 9/1960 | Bolster | 192/106 F |
| 3,576,241 | 4/1971 | Maurice et al. | 192/85 AA |
| 4,318,311 | 3/1982 | Ross | 192/103 FA X |
| 4,421,218 | 12/1983 | Haight | 192/106 F |
| 4,425,879 | 1/1984 | Shadday et al. | 192/106 F X |
| 4,574,926 | 3/1986 | Bubak | 192/106 F X |

Primary Examiner—Leslie A. Braun
Assistant Examiner—Richard M. Lorence
Attorney, Agent, or Firm—Davis, Bujold & Streck

[57] ABSTRACT

A ball drain valve (2), for the piston space (33) of a rotary clutch disc (3) for releasing the clutch disc piston (32) from pressure generated by rotation of pressurized oil remaining in the piston space when it is bled, including an opening (220), at least two ball spaces (25, 26) and a ball valve (23) actuated by rotation and control pressure. The ball drain valve (2) has two stages coordinated with the engaged and the disengaged positions of the clutch and the two ball spaces (25, 26) have outer diameters (D1, D2) of different sizes so that the ball valve (23), when the multi-disc clutch (3) is engaged, is in ball space (25) of large diameter (D1) and, when the clutch is disengaged, the ball valve is in ball space (26) of small diameter (D2). This arrangement achieves a quick drainage of the piston space (33) past a large gap (250) when the clutch is disengaged and prevents very little pressurized oil from escaping past a small gap (260) when the clutch (3) is engaged.

9 Claims, 1 Drawing Sheet

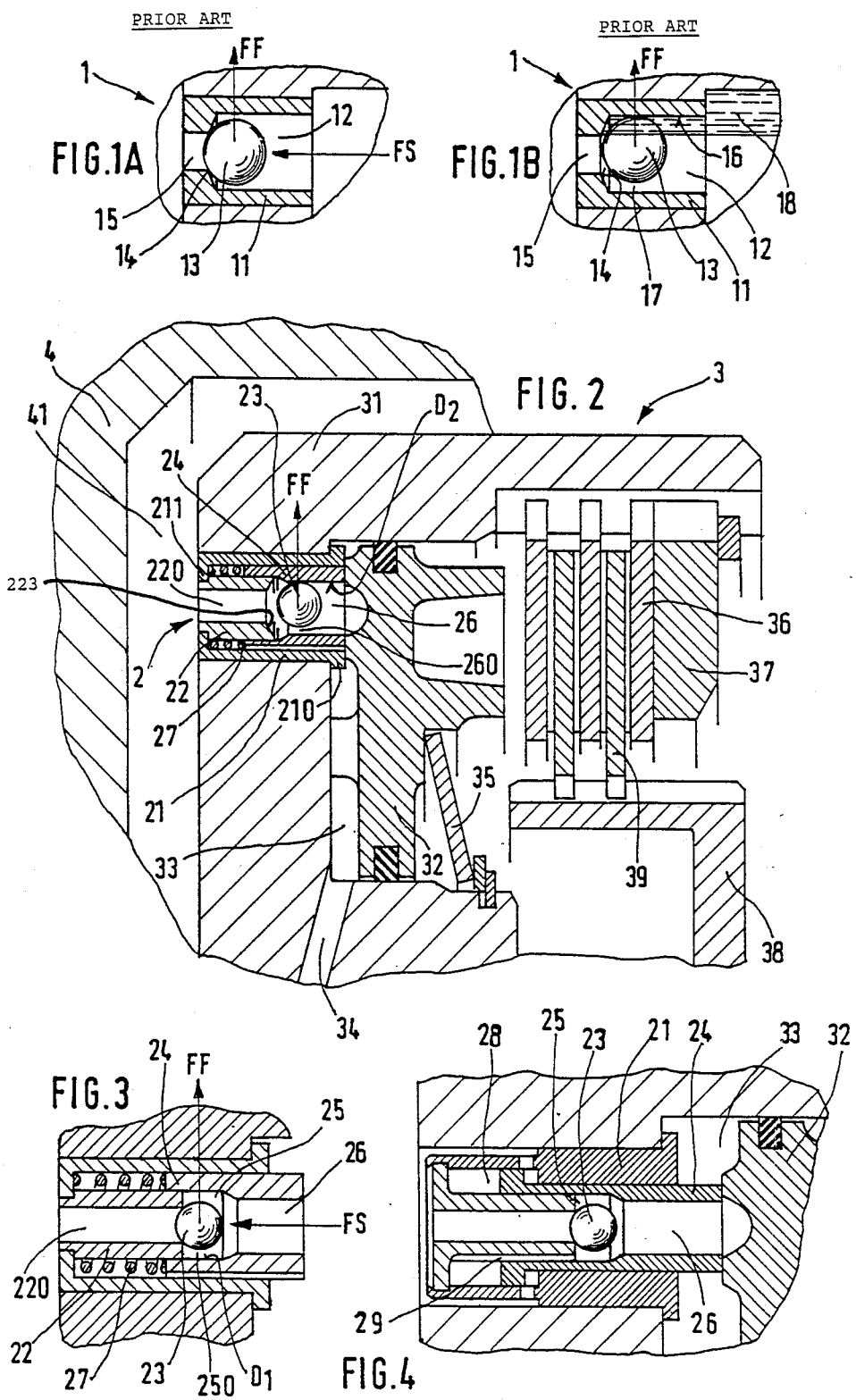

BALL DRAIN VALVE FOR THE PISTON SPACE OF A ROTARY MULTI-DISC CLUTCH

The invention concerns a ball drain valve for a rotary multi-disc clutch.

It is generally known, in rotary multi-disc clutches such as are used in an automatic transmissions, to situate ball drain valves for draining, from the clutch operating piston space, pressurized oil near the outer diameter of that space to relieve the piston from the pressure (centrifugal pressure) due to rotation of the oil. The valve opens automatically when the piston space is to be bled by being radially outwardly lifted by centrifugal force. The pressurized oil which is subjected only to pressure due to its rotation in the piston space can flow out behind the ball seat, for instance, into the transmission space. For quick drainage of the piston space it is desirable that the difference in diameter between the ball valve and its valve housing be as large as possible. When the clutch is to be engaged, the piston space is pressurized with pressurized oil and the ball valve must be close against the action of centrifugal force and the pressure of the outflowing oil, and this, in the case of high speed and a large diameter of the valve housing, often results in the valve not closing and in hesitation in the engagement of the clutch when the control pressure is not high enough. If this disadvantage is counteracted by using a smaller diameter of the valve housing, the gap between housing and ball becomes reduced and the ball closes more quickly. However, in such a case the bleeding of the piston space, when the clutch is to be disengaged, takes longer because the pressurized oil drains more slowly than with a large gap.

Accordingly, the problem solved by the present invention is the development of a ball drain valve for relieving pressure in a piston operating space of a multi-disc clutch which provides both a quick drainage of the piston space when the clutch disengages and a quick closing of the drain valve in order to avoid unacceptable delay in the engagement of the clutch. In addition, the changing operational characteristics of the ball drain valve resulting from changes in the speed of the clutch and the magnitude by the control pressure is substantially eliminated by the present invention. In addition, the present invention accomplishes this in a simple manner.

This problem is solved by disposing a ball supporting sleeve between the housing of the ball drain valve and the valve seat and providing for axial movement of that sleeve under the control of the piston of the multi-disc clutch, to provide two ball spaces, for the valve ball of the valve, of different diameters, one of large diameter to provide good opening properties of the clutch and one of small diameter to provide a rapid engagement of the clutch. The position of the ball supporting sleeve is controlled by the piston of the clutch so that the two-stage operation of the ball drain valve is coordinated with the opening and closing positions of the multi-disc clutch. The guidance of the ball supporting sleeve during closing of the piston can be effected by a spring or by the pressure of the pressurized oil in the piston space. By virtue of the two-stage operation of the drain valve, the valve is well adapted to the requirements of a rotary multi-disc clutch required to operate with a small control pressure and high speed during clutch engagement and disengagement.

According to the invention there is provided a ball drain valve (2) for a piston space (33) of a rotary multi-disc clutch (3), having piston (32), to release the piston (32) from the pressure of rotation of the pressurized oil in the piston space (33) when bled, comprising a housing (21), an opening (220) and a valve ball (23) actuated by centrifugal force and oil pressure, said ball (23) being disposed in connected ball spaces (25, 26) of different diameters (D1, D2), the space occupied by said valve ball (23) being determined by the axial position of said piston (32) relative to the valve (2).

Other details of the invention are explained, by way of example, with reference to accompanying drawings, in which:

FIG. 1A and 1B show, in section, two positions according to the prior art, of a ball drain valve for the piston space of a rotary multi-disc clutch;

FIG. 2 shows, in its open position and in section, a rotary multi-clutch with a two-stage drain valve according to the present invention;

FIG. 3 shows a two-stage drain valve as shown in FIG. 2 but in its closed position with a pressure spring for control of the ball support sleeve; and FIG. 4 shows a two-stage drain valve according to FIG. 3, but with a space for fluid under pressure to provide axial movement of the ball support sleeve.

FIG. 1A and 1B show a prior art ball drain valve 1 for the piston space 33 of a rotary multi-disc clutch (such as clutch 3 of FIG. 2) in its closed position (FIG. 1A) and open position (FIG. 1B). In the housing 11 are situated both the ball space 12 for the ball valve 13 and the valve seat 14 and, shaped as bore, the opening 15 of the ball drain valve 1. According to FIG. 1A, in the closed position, the opening 15 is closed by the ball 13 on the valve seat 14, since the closing force FS acting upon the ball 13, by the pressure of the pressurized fluid, overcomes the radially outwardly directed centrifugal force FF acting on the ball 13. Only when the control pressure is eliminated (i.e. when the piston space 33 of the clutch 3 is bled) does the centrifugal force FF prevail so that the ball 13 is radially outwardly pressed against the wall 16 of the ball space 12. Thereby the pressurized oil can flow out over the gap 17 and the opening 15 leaving only a residual oil ring 18, which does not significantly affect the piston 32.

FIG. 2 shows the two-stage ball drain valve 2 in its open position. This valve is situated in the clutch support 31 in a position in which, when the multi-disc clutch 3 is disengaged, it connects the piston space 33 with the transmission space 41 between the rotating multi-disc clutch 3 and the transmission housing 4. Piston operating space 33 is supplied by way of pressurized oil supply duct 34 and piston 32 is biased by spring 35 to its clutch disengaged position. Using splines, in a manner known per se the outer discs 36 and the end disc 37 are engaged with the clutch support 31 and the inner discs 39 with the inner disc carrier 38. The housing 21 of the two-stage ball drain valve 2 has a collar 210 by which it abuts and is located in the clutch support 31. The collar 210 projects into the piston space 33. Housing 21 has a bottom flange 211 remote from collar 210 and houses seat member valve 22 which defines seat 223 and the outlet 220 of the valve 2. Between the housing 21 and the member 22 is axially movably situated a ball supporting sleeve 24 which has a recessed bore providing two adjacent ball spaces 25 (FIG. 3), 26 of which one is inside close to the valve seat and has a relatively large diameter D1 (FIG. 3) and the other is outside close to the piston 32 of the multi-disc clutch 3 and has a relatively small diameter D2. The outside of the ball supporting sleeve 24 is guided by the housing 21 and the inside of the sleeve 24 by the valve seat 22. Between the outwardly directed front face of the ball supporting sleeve 24 and the bottom of the housing 21 there is a spring housing within which is a pressure spring 27 which biases the outer face of sleeve 24 against the piston 32 of the multi-disc clutch so that the ball supporting sleeve 24 moves with the axial motion of the piston 32 when the piston space 33 is filled and emptied.

FIG. 3 shows a two-stage ball drain valve 2 according to FIG. 2, but in the closed position in which the rotary multi-disc clutch 3 is engaged. The two-stage ball drain valve 2 according to FIG. 2 and 3 operates as follows:

When pressurized oil is conveyed via the supply duct 34 into the piston space 33 to engage the rotary multi-disc clutch 3, the ball 23 is also actuated with pressurized oil. This is because the ball space 26 is always connected with the piston space 33 even when the front face of the ball supporting sleeve 24 abuts on the piston 32. Due to the small diameter D2 of the ball space 26 the ball 23 is moved only slightly radially outwardly by the centrifugal force FF leaving only small clearance 260 (FIG. 2) and, with this, the ball is very quickly pressed upon the valve seat to close the opening 220. At the same time, prior to this operation and due to the small gap 260 between the ball 23 and the only slightly larger diameter D2 of the ball space 26, very little pressurized oil can escape and thus the build-up of pressure in the piston space 33 takes place quickly and the rotary multi-disc clutch 3 is quickly engaged as desired. This is also possible with a relatively low pressure of the oil and at high rotational speed of the clutch support 31. When the clutch 3 is engaged, the pressure spring 27 causes the ball supporting sleeve 24 to move to the position shown in FIG. 3. As a result of this, the ball 23 is located in the ball space 25 of large diameter D1. If the piston space 33 is now bled in order to disengage the multi-disc clutch 3, the oil pressure is also eliminated on the ball 23 and the centrifugal force FF moves the ball 23 radially outwardly in the large diameter D1 in the ball space 25 to produce a large gap 250 which combined with the opening 220 very quickly allows the drainage of the piston space 33. Only when the piston 32 has already disengaged the multi-disc clutch under the action of the recoil spring 35, and there is left in the piston space 33 only a little oil, does the ball 23 shift back into the ball space 26 of small diameter D2 due to the movement of the ball supporting sleeve 24 by piston 32 against the bias of spring 27 as shown in FIG. 2.

If as shown in FIG. 4 the pressure space 28 is connected with the ball space 25, 26 via at least one duct 29, the ball supporting sleeve 24 can be biased when the multi-disc clutch 3 is engaged by the pressure of the oil in the piston space 33 and the pressure spring 27 can be eliminated. When the clutch disengages - that is, when no pressurized oil is available - the ball supporting sleeve 24 is positively returned via the piston 32 against the action of the recoil spring 35.

The invention is not exclusively limited to the embodiments illustrated. Thus, for instances, the two-stage ball drain valve 2 can also be placed in the piston itself, the ball supporting sleeve 24 resting then on the clutch support 31.

I claim:

1. A ball drain valve (2), for a piston space (33) of a rotary multi-disc clutch (3) which includes a piston (32), to release the piston (32) from pressure generated by rotation of pressurized oil remaining in the piston space (33) when bled, comprising a housing (21), an opening (220) and a valve ball (23) actuated by centrifugal force and oil pressure, said valve ball (23) being disposed in interconnected ball spaces (25, 26) of different diameters (D1, D2), and the space occupied by said valve ball (23) being determined by the axial position of said piston (32) relative to the valve (2), wherein said valve ball (23) occupies the ball space (25) of relatively large diameter (D1) when said multi-disc clutch (3) is engaged and said ball drain valve (2) is closed and said valve ball (23) occupies the ball space (26) of relatively small diameter (D2) when said multi-disc clutch (3) is disengaged and said ball drain valve (2) is open.

2. A ball drain valve according to claim 1, wherein an axially movable ball supporting sleeve (24), having a stepped inner diameter (D1, D2), is disposed between said housing (21) and a seat member valve (22), defining a valve seat (223) and said opening (220), to provide said interconnected ball spaces (25, 26) of different diameters (D1, D2) for said valve ball (23).

3. A ball drain valve according to claim 2, wherein said axially movable ball supporting sleeve (24) abuts with a face of said piston (32), and axially moves with said piston (32), such that said ball spaces (25, 26) always maintain a fluid flow path with said piston space (33).

4. A ball drain valve according to claim 3, wherein a pressure spring (27) is situated, in a spring space, between a bottom (211) of said housing (21) and said ball supporting sleeve (24) for biasing said ball supporting sleeve (24) toward said piston (32) so that said sleeve (24) moves with said piston (32).

5. A ball drain valve according to claim 3, wherein a pressure space (28) is disposed between a bottom (211) of said housing (21) and said ball supporting sleeve (24) and the pressure space is continuously connected, via at least one duct (29), with said ball spaces (25, 26) and said piston space (33).

6. A ball drain valve according to claim 1, in which said housing (21) is firmly connected to a clutch support 31 by a collar (210) and a seat member valve (22), defining a valve seat (223) and said opening (220) to a transmission space (41), is disposed therein;

between said housing (21) and said member valve (22) there is situated a ball supporting sleeve (24), carrying said interconnected ball spaces, which is movable in an axial direction via a pressure spring (27) situated, in a spring space, between a bottom (211) of said housing (21) and said ball supporting sleeve (24) for biasing said ball supporting sleeve (24) toward said piston (32), the ball space (25) with a large diameter (D1) is closest to said valve seat and the ball space (26) with a small diameter (D2) is closest to said piston (32);

wherein said small ball space (26) has a slightly larger diameter than said ball valve (23) so that a small gap (260) results between said ball valve and said small diameter (D2) and a larger gap (250) results between said large diameter (D1) and said ball valve (23), when said ball valve (23) is in the respective ball spaces (25, 26), and movement of said ball supporting sleeve (24) is controlled by the pressure spring (27) and said piston (32).

7. A ball drain valve according to claim 1, wherein a pressure space (28), connected by a duct (29) to at least one of said interconnected ball spaces (25, 26), is situated between said housing (21) and said ball supporting sleeve (24) for biasing said ball supporting sleeve (24) toward said piston (32) as pressurized oil flows into said piston space to engage said multi-disc clutch (3).

8. A ball drain valve according to claim 1, wherein said ball drain valve (2) is situated in a clutch support (31).

9. A ball drain valve (2), for a piston space (33) of a rotary multi-disc clutch (3) which includes a piston (32), to release the piston (32) from pressure generated by rotation of pressurized oil remaining in the piston space (33) when bled, comprising a housing (21), an opening (220) fixed relative to said housing (21) and a valve ball (23) actuated by centrifugal force and oil pressure to open and close the opening, said valve ball (23) being disposed within an axially movable sleeve (24) containing two interconnected ball spaces (25, 26) of different diameters (D1, D2), wherein the ball space (25 or 26) to be occupied by said valve ball (23) is determined by the axial position of the sleeve (24) as controlled by interaction of said piston (32) and said sleeve (24) relative to the opening (220).

* * * * *